(12) United States Patent
Akiyama

(10) Patent No.: US 11,085,851 B2
(45) Date of Patent: Aug. 10, 2021

(54) METHOD FOR CALCULATING ESTIMATION VALUE OF MECHANICAL CHARACTERISTIC PARAMETER

(71) Applicant: MEIDENSHA CORPORATION, Tokyo (JP)

(72) Inventor: Takao Akiyama, Tokyo (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 16/624,213

(22) PCT Filed: Jun. 14, 2018

(86) PCT No.: PCT/JP2018/022745
§ 371 (c)(1),
(2) Date: Dec. 18, 2019

(87) PCT Pub. No.: WO2018/235720
PCT Pub. Date: Dec. 27, 2018

(65) Prior Publication Data
US 2020/0348206 A1 Nov. 5, 2020

(30) Foreign Application Priority Data
Jun. 20, 2017 (JP) .............................. JP2017-120563

(51) Int. Cl.
*G01M 13/02* (2019.01)
*G01M 13/022* (2019.01)
*G01M 13/021* (2019.01)

(52) U.S. Cl.
CPC ........ *G01M 13/022* (2013.01); *G01M 13/021* (2013.01)

(58) Field of Classification Search
CPC .. G01M 13/02; G01M 13/021; G01M 13/022; G01M 13/025
See application file for complete search history.

(56) References Cited

U.S. PATENT DOCUMENTS

2005/0041898 A1 2/2005 Yamada et al.
2013/0074609 A1 3/2013 Goetting
(Continued)

FOREIGN PATENT DOCUMENTS

JP 3912543 B2 2/2007
JP 2008-076061 A 4/2008
(Continued)

OTHER PUBLICATIONS

Notice of Reasons for Rejection issued to JP Application No. 2017-120563, dated Aug. 28, 2018 (2 pages).
(Continued)

*Primary Examiner* — Eric S. McCall
(74) *Attorney, Agent, or Firm* — Muncy, Geissler, Olds & Lowe, P.C.

(57) ABSTRACT

The mechanical characteristic estimating method is a method for estimating a value of a mechanical characteristic parameter of a test piece W provided with a first shaft S1, and a second shaft S2 and a third shaft S3 which are connected to the first shaft S1. The mechanical characteristic estimating method includes: a first measuring step of measuring a resonant frequency $\omega L$ of the test piece in a state in which a gear ratio of the transmission TM1 and the differential gear TM2 is set to a first gear ratio gL; a second measuring step of measuring the resonant frequency $\omega H$ of the test piece in a state in which the gear ratio is set to a second gear ratio gH; and an estimating step of calculating the resonant frequencies $\omega L$ and $\omega H$, the gear ratios gL and gH, and an estimated value of a spring stiffness.

6 Claims, 8 Drawing Sheets

(56) References Cited

U.S. PATENT DOCUMENTS

| | | | | |
|---|---|---|---|---|
| 2015/0142341 A1* | 5/2015 | Akiyama | ............ | G01M 13/025 |
| | | | | 702/41 |
| 2016/0109328 A1* | 4/2016 | Kanke | ................. | G01M 13/025 |
| | | | | 73/865.6 |
| 2016/0327451 A1 | 11/2016 | Bauer et al. | | |
| 2019/0219481 A1* | 7/2019 | Akiyama | .................. | H02P 6/08 |
| 2020/0271539 A1* | 8/2020 | Akiyama | ............ | G01M 13/025 |

FOREIGN PATENT DOCUMENTS

| JP | 2008-203051 A | 9/2008 |
|---|---|---|
| JP | 5546683 B2 | 5/2014 |
| JP | 2014122804 A | 7/2014 |
| JP | 5920200 B | 4/2016 |
| JP | 2016-080388 A | 5/2016 |

OTHER PUBLICATIONS

Notice of Decision to Grant a Patent to JP Application No. 2017-120563, dated Dec. 11, 2018 (1 page).

* cited by examiner

METHOD FOR CALCULATING ESTIMATION VALUE OF MECHANICAL CHARACTERISTIC PARAMETER

TECHNICAL FIELD

The present invention relates to characteristic estimation methods. More specifically, the present invention relates to a mechanical characteristic estimation method of estimating values of mechanical characteristic parameters of a test piece which includes three shafts and a transmission mechanism.

BACKGROUND ART

A drive train is a generic name for a plurality of devices for transmitting energy generated in an engine to drive wheels, and is formed with the engine, a clutch, a transmission, a propeller shaft, a differential gear, drive shafts and the like. In the drive train bench system as described above, the drive train as described above is used as a test piece, and thus a load test is performed. In the drive train bench system, the engine is simulated with a first dynamometer connected to the input shaft of the test piece, vehicle body inertia and the like are simulated with second and third dynamometers connected to the left and right drive shafts of the test piece and thus the load test and the like on the test piece are performed.

In order to highly accurately perform the load test in the drive train bench system as described above, it is necessary to highly accurately estimate values of the moment of inertia, the stiffness and the like of the test piece and to use the values of the estimated mechanical characteristic parameters for the control of the first to third dynamometers. Patent Documents 1 and 2 disclose technologies for estimating the moment of inertia, the stiffness and the like of a test piece.

Patent Document 1: Japanese Unexamined Patent Application, Publication No. 2008-76061
Patent Document 2: Japanese Unexamined Patent Application, Publication No. 2008-203051

DISCLOSURE OF THE INVENTION

Problems to be Solved by the Invention

For example, Patent Document 1 discloses the technology in which in an engine bench system where a dynamometer is connected to an engine, the engine bench system is regarded as a two-inertia system, two moments of inertia and a spring stiffness in the two-inertia system are estimated. On the other hand, in a drive train bench system, since dynamometers are individually connected to three shafts of a drive train, it is not appropriate to approximate the drive train system with a two-inertia system as in Patent Document 1. Hence, it is difficult to apply the technology of Patent Document 1 so as to estimate the mechanical characteristic parameters of the drive train serving as the test piece.

Patent Document 2 discloses the technology in which a non-linear programming method is utilized so as to estimate the moments of inertia, the spring stiffness of a shaft and the like in a multi-inertia system. Since the technology disclosed in Patent Document 2 is a technology which is generalized to the multi-inertia system, it is possible to utilize this technology so as to estimate the mechanical characteristic parameters of the drive train. However, although the drive train includes, as described above, the transmission mechanism of a transmission, a differential gear and the like, in the technology of Patent Document 2, sufficient consideration is not given to the presence of the transmission mechanism as described above.

The frequency characteristic of the drive train is generally changed by a gear ratio in the transmission mechanism. Hence, in the technology of Patent Document 2, the result of the estimation of the mechanical characteristic parameters may be changed by the gear ratio in the drive train. In other words, although in the technology of Patent Document 2, the result of the estimation of the mechanical characteristic parameters is obtained for each of gear ratios in the transmission mechanism, there is no guarantee that the results of the estimation obtained at the individual gear ratios are the same value, with the result that the convenience thereof is low.

An object of the present invention is to provide a mechanical characteristic estimation method capable of estimating values of mechanical characteristic parameters of a test piece including three shafts and a transmission mechanism regardless of a gear ratio in the transmission mechanism.

Means for Solving the Problems (1) A mechanical characteristic estimation method (for example, a mechanical characteristic estimation method of FIG. 6 which will be described later) of the present invention is a method of estimating a value of a mechanical characteristic parameter of a test piece (for example, a test piece W which will be described later) which includes a first shaft (for example, a first shaft S1 which will be described later) and a second shaft (for example, a second shaft S2 which will be described later) and a third shaft (for example, a third shaft S3 which will be described later) that are connected to the first shaft through a transmission mechanism (for example, a transmission TM1 and a differential gear TM2 which will be described later) so as to be able to transfer power thereto, and the mechanical characteristic estimation method includes: a first measurement step (for example, processing in S21 of FIG. 6 which will be described later) of measuring the resonant frequency (for example, a resonant frequency $\omega L$) of the test piece in a state where the gear ratio of the transmission mechanism is set to a first gear ratio (for example, a first gear ratio gL which will be described later); a second measurement step (for example, processing in S22 of FIG. 6 which will be described later) of measuring the resonant frequency (for example, a resonant frequency $\omega H$) of the test piece in a state where the gear ratio of the transmission mechanism is set to a second gear ratio (for example, a second gear ratio gH which will be described later) different from the first gear ratio; and the estimation step (for example, processing in S23 of FIG. 6 which will be described later) of calculating an estimated value of the mechanical characteristic parameter by using the resonant frequency obtained in the first measurement step, the resonant frequency obtained in the second measurement step, the first gear ratio and the second gear ratio.

(2) Preferably, in this case, a first electric motor (for example, a first dynamometer 21 which will be described later) is coupled to the first shaft, a second electric motor (for example, a second dynamometer 22 which will be described later) is coupled to the second shaft, a third electric motor (for example, a third dynamometer 23 which will be described later) is coupled to the third shaft and in the first and second measurement steps, a torque current command signal (for example, torque current command signals i1, i2, i3 which will be described later) to any one of the first electric motor, the second electric motor and the third electric motor is set to an input, any one of a shaft torque of the first shaft (for example, a first shaft torque detection signal t1 which will be described later), a shaft torque of the second shaft (for example, a second shaft torque detection signal t2 which will be described later), a shaft torque of the third shaft (for example, a third shaft torque detection signal t3 which will be described later), an angular velocity of the first electric motor (for example, a first angular velocity detection signal w1 which will be described later), an angular velocity of the second electric motor (for example, a second angular velocity detection signal w2 which will be described later) and an angular velocity of the third electric motor (for example, a third angular velocity detection signal w3 which will be described later) is set to an output and the resonant frequency is measured based on a frequency response from the input to the output.

(3) Preferably, in this case, a mechanical system formed by connecting the first, second and third electric motors to the test piece is modeled by a five-inertia system model that includes: a first inertia body which has a moment of inertia of the first electric motor; a second inertia body which has a moment of inertia of the second electric motor; a third inertia body which has a moment of inertia of the third electric motor; a transmission element which changes gears at the gear ratio between one input portion and two output portions; a first shaft body which has a predetermined first spring stiffness and which connects together the first inertia body and the input portion; a second shaft body which has a second moment of inertia and a second spring stiffness and which connects together one of the two output portions and the second inertia body; and a third shaft body which has a third moment of inertia and a third spring stiffness and which connects together the other of the two output portions and the third inertia body, and in the estimation step, any one of the first, second and third spring stiffnesses is set to the mechanical characteristic parameter such that the estimated value thereof is calculated.

(4) Preferably, in this case, the first gear ratio is either of the minimum gear ratio and the maximum gear ratio of gear ratios which can be set in the transmission mechanism, and the second gear ratio is the other of the minimum gear ratio and the maximum gear ratio.

Effects of the Invention (1) In the first measurement step of the present invention, in a test piece which includes three shafts and a transmission mechanism, the resonant frequency of the test piece in a state where the gear ratio of the transmission mechanism is set to a first gear ratio is measured, in a second measurement step, the resonant frequency of the test piece in a state where the gear ratio of the transmission mechanism is set to a second gear ratio different from the first gear ratio is measured and in an estimation step, the resonant frequencies measured in these two steps, the first gear ratio and the second gear ratio are used so as to calculate the estimated value of a mechanical characteristic parameter. As described above, in the present invention, the resonant frequencies measured at the two different gear ratios are used so as to calculate the estimated value of the mechanical characteristic parameter, and thus it is possible to estimate the value of the mechanical characteristic parameter regardless of the gear ratio of the transmission mechanism. In the present invention, it is convenient that in order to estimate the value of the mechanical characteristic parameter, it is only necessary to measure resonant frequencies measured at two different gear ratios.

(2) In the first and second measurement steps of the present invention, a torque current command signal to any one of first to third electric motors is set to an input, any one of the shaft torques of first to third shafts and the angular velocities of the first to third electric motors is set to an output, a frequency response from the input to the output is measured and thus a resonant frequency is measured. In this way, it is possible to easily measure a resonant frequency at each of gear ratios, with the result that it is possible to easily estimate the mechanical characteristic parameter of the test piece.

(3) In the present invention, a mechanical system formed with the test piece and the first to third electric motors is modeled by a five-inertia system model formed with first to third inertia bodies, a transmission element and first to third shaft bodies, and in the estimation step, the spring stiffness of any one of the first to third shaft bodies is set to the mechanical characteristic parameter and thus the estimated value thereof is calculated. It is considered that it is appropriate to model, with the five-inertia system model as described above, a test system formed by connecting the three electric motors to the test piece including the three shafts and the transmissions. In the present invention, any one of the first to third spring stiffnesses in the five-inertia system model as described above is set to the mechanical characteristic parameter, and thus the estimated value thereof is calculated. Hence, in the present invention, the estimated value of the mechanical characteristic parameter is used, and thus it is possible to enhance the accuracy of control based on the five-inertia system model as described above.

(4) In the first and second measurement steps of the present invention, resonant frequencies are measured at the minimum gear ratio and the maximum gear ratio which can be set in the transmission mechanism respectively, and they are used for calculating the estimated value of the mechanical characteristic parameter. In this way, as compared with a case where resonant frequencies measured at gear ratios which are close to each other are used to calculate an estimated value, it is possible to enhance the accuracy of the estimation of the mechanical characteristic parameter.

PREFERRED MODE FOR CARRYING OUT THE INVENTION

Figure 1:
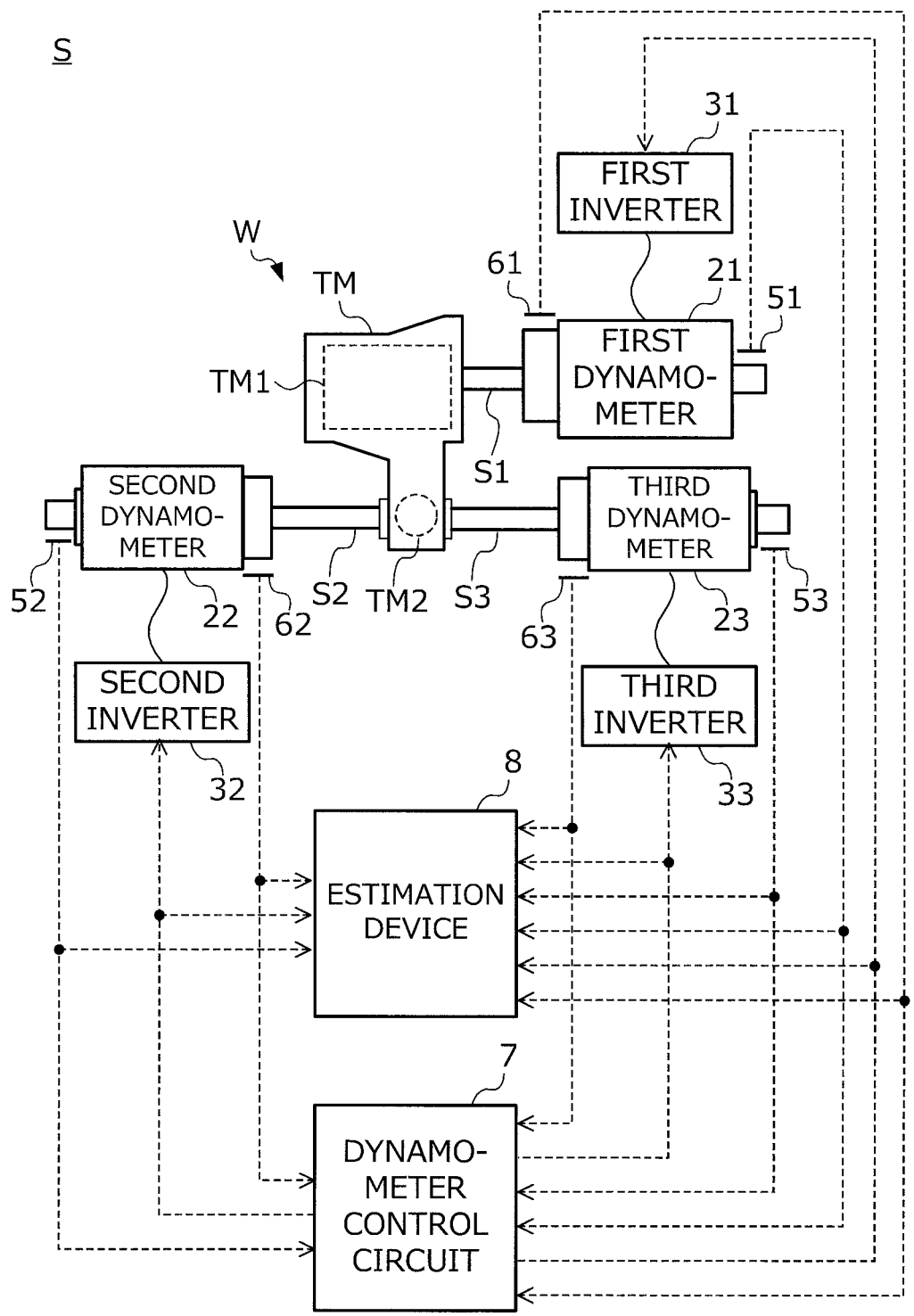
FIG. 1 is a diagram showing the configuration of a test system to which a mechanical characteristic estimation method according to an embodiment of the present invention is applied.

An embodiment of the present invention will be described in detail below with reference to drawings. FIG. 1 is a diagram showing the configuration of a test system S to which a mechanical characteristic estimation method according to the present embodiment is applied. The test system S is a so-called drive train bench system, the drive train of a vehicle is used as a test piece W and the performance of the test piece W is evaluated. The mechanical characteristic estimation method is a method of using the test system S so as to estimate values of mechanical characteristic parameters of the test piece W.

The test piece W includes: a first shaft S1 to which an unillustrated engine is connected in a completed vehicle; a second shaft S2 and a third shaft S3 serving as left and right drive shafts to which left and right drive wheels are connected in the completed vehicle; and a transmission unit TM which connects the first shaft S1 to the second shaft S2 and the third shaft S3 so as to be able to transfer power thereto. The transmission unit TM includes: a transmission TM1 which changes gears in the output of the first shaft S1; and a differential gear TM2 which further changes gears in the output of the first shaft S1 subjected to the gear change with the transmission TM1 so as to transmit the output to the second shaft S2 and the third shaft S3. In the following description, the gear ratio of the transmission TM1 is referred to as a transmission gear ratio ga and the gear ratio of the differential gear TM2 is referred to as a final gear ratio gb. Here, the transmission gear ratio ga can be changed between the minimum transmission gear ratio gaL and the maximum transmission gear ratio gaH. The final gear ratio gb is a fixed value. In the following description, a gear ratio between the first shaft S1 and the second shaft S2 or the third shaft S3 in the entire test piece W formed with a combination of the transmission TM1 and the differential gear TM2 is referred to as a total gear ratio g (ga×gb).

The test system S includes: the test piece W; a first dynamometer 21, a second dynamometer 22 and a third dynamometer 23 which are coupled to the test piece W; a first inverter 31, a second inverter 32 and a third inverter 33 which supply power to the dynamometers 21 to 23; a first angular velocity detector 51, a second angular velocity detector 52 and a third angular velocity detector 53 which detect the angular velocities of shafts in the dynamometers 21 to 23; a first shaft torque detector 61, a second shaft torque detector 62 and a third shaft torque detector 63 which detect the shaft torques of the dynamometers 21 to 23; a dynamometer controller 7 which inputs torque current command signals to the inverters 31 to 33; and an estimation device 8 which estimates an input/output characteristic from a predetermined input to a predetermined output in the test system S and the values of the mechanical characteristic parameters that characterize the test piece W and the like.

The output shaft of the first dynamometer 21 is coaxially coupled to the first shaft S1 of the test piece W. The output shaft of the second dynamometer 22 is coaxially coupled to the second shaft S2 of the test piece W. The output shaft of the third dynamometer 23 is coaxially coupled to the third shaft S3 of the test piece W.

The first angular velocity detector 51 detects a first angular velocity which is a rotation angle of the output shaft of the first dynamometer 21 per unit time, and generates a first angular velocity detection signal w1 corresponding to the first angular velocity. The second angular velocity detector 52 detects a second angular velocity which is a rotation angle of the output shaft of the second dynamometer 22 per unit time, and generates a second angular velocity detection signal w2 corresponding to the second angular velocity. The third angular velocity detector 53 detects a third angular velocity which is a rotation angle of the output shaft of the third dynamometer 23 per unit time, and generates a third angular velocity detection signal w3 corresponding to the third angular velocity.

The first shaft torque detector 61 detects a torsion torque (hereinafter referred to as the "first shaft torque") generated in the first shaft S1, and generates a first shaft torque detection signal t1 corresponding to the first shaft torque. The second shaft torque detector 62 detects a torsion torque (hereinafter referred to as the "second shaft torque") generated in the second shaft S2, and generates a second shaft torque detection signal t2 corresponding to the second shaft torque. The third shaft torque detector 63 detects a torsion torque (hereinafter referred to as the "third shaft torque") generated in the third shaft S3, and generates a third shaft torque detection signal t3 corresponding to the third shaft torque.

The dynamometer controller 7 uses the angular velocity detection signals w1 to w3, the shaft torque detection signals t1 to t3 and predetermined command signals, thereby generates, based on a predetermined algorithm, a first torque current command signal i1 which is a torque current command signal for the first dynamometer 21, a second torque current command signal i2 which is a torque current command signal for the second dynamometer 22 and a third torque current command signal i3 which is a torque current command signal for the third dynamometer 23 and respectively inputs the signals i1 to i3 to the inverters 31 to 33. The first inverter 31 supplies power corresponding to the first torque current command signal i1 to the first dynamometer 21. The second inverter 32 supplies power corresponding to the second torque current command signal i2 to the second dynamometer 22. The third inverter 33 supplies power corresponding to the third torque current command signal i3 to the third dynamometer 23.

The estimation device 8 uses the angular velocity detection signals w1 to w3, the shaft torque detection signals t1 to t3 and the torque current command signals i1 to i3 under control of the dynamometers 21 to 23 by the dynamometer controller 7 as described above, and thereby estimates the input/output characteristic from the predetermined input signal to the predetermined output signal in the test system S and the values of the mechanical characteristic parameters of the test piece W. An input/output characteristic estimation method and the mechanical characteristic estimation method which can be realized with the test system S will be sequentially described below.

<Input/Output Characteristic Estimation Method>

Figure 2:
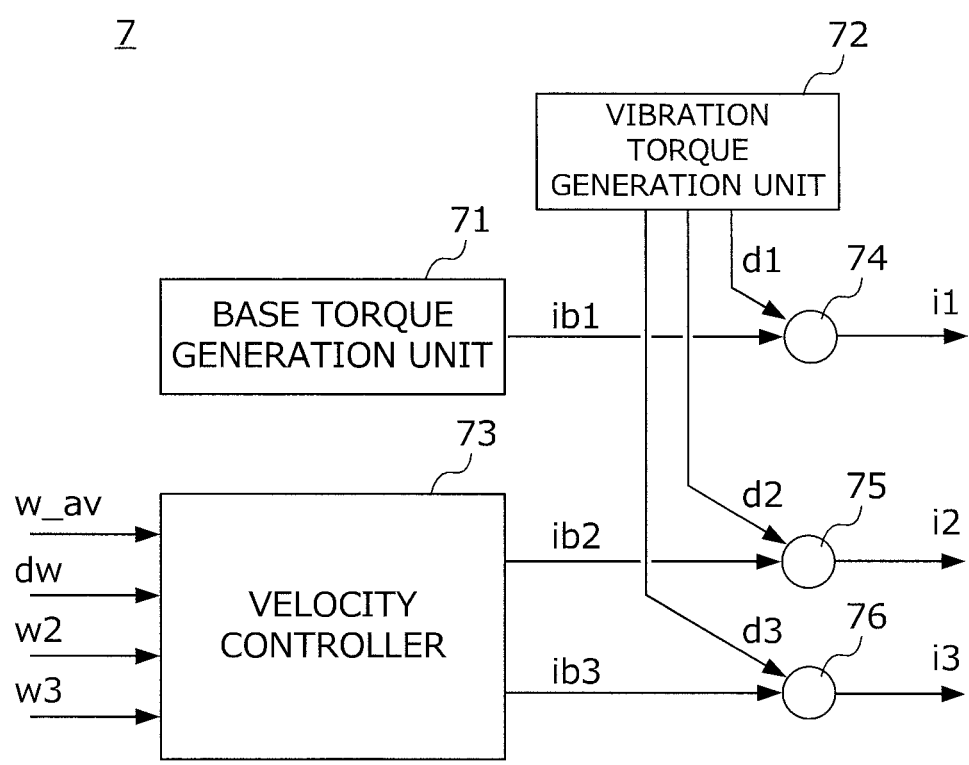
FIG. 2 is a diagram showing the configuration of part of the control circuit of a power system controller which is used particularly when the input/output characteristic of the test system is estimated.

FIG. 2 is a diagram showing the configuration of the control circuit of the dynamometer controller 7. More specifically, FIG. 2 shows only part of the control circuit configuring the dynamometer controller 7 which is used when the input/output characteristic of the test system S is estimated with the estimation device 8.

A base torque generation unit 71 generates a base torque command signal ib1 which is not changed with time so as to have a constant magnitude. A vibration torque generation unit 72 generates a first vibration torque input d1, a second vibration torque input d2 and a third vibration torque input d3 which are randomly varied within a predetermined range with zero in the center at a predetermined vibration frequency.

When the first vibration torque input d1 is not generated, a first command signal generation unit 74 outputs the first base torque command signal ib1 as the first torque current command signal i1 whereas when the first vibration torque input d1 is generated, the first command signal generation unit 74 outputs, as the first torque current command signal i1, a signal obtained by superimposing the input d1 on the base torque command signal ib1.

A velocity controller 73 uses the predetermined command signals, the second angular velocity detection signal w2 and the third angular velocity detection signal w3 so as to generate a second torque control input ib2 which is an input to the second dynamometer 22 and a third torque control input ib3 which is an input to the third dynamometer 23 for controlling the second angular velocity and the third angular velocity to predetermined targets. More specifically, when an average velocity command signal w_av which is a command signal for the average velocity of the second angular velocity and the third angular velocity and which is not changed with time and a differential velocity command signal dw (which is assumed to be zero in the following description) which is a command signal for a difference between the second angular velocity and the third angular velocity and which is not changed with time are input, the velocity controller 73 uses a known feedback algorithm to generate the second torque control input ib2 and the third torque control input ib3 such that the average ((w2+W3)/2) of the second angular velocity detection signal w2 and the third angular velocity detection signal w3 is the average velocity command signal w_av and that a difference (w2−w3) between the second angular velocity detection signal w2 and the third angular velocity detection signal w3 is the differential velocity command signal dw.

When the second vibration torque input d2 is not generated, a second command signal generation unit 75 outputs the second torque control input ib2 as the second torque current command signal i2 whereas when the second vibration torque input d2 is generated, the second command signal generation unit 75 outputs, as the second torque current command signal i2, a signal obtained by superimposing the input d2 on the second torque control input ib2.

When the third vibration torque input d3 is not generated, a third command signal generation unit 76 outputs the third torque control input ib3 as the third torque current command signal i3 whereas when the third vibration torque input d3 is generated, the third command signal generation unit 76 outputs, as the third torque current command signal i3, a signal obtained by superimposing the input d3 on the third torque control input ib3.

As described above, when the input/output characteristic of the test system S is estimated, the dynamometer controller 7 superimposes, while performing torque current control on the first dynamometer 21 with the base torque command signal ib1, the first vibration torque input d1 as necessary so as to perform vibration control. When the input/output characteristic of the test system S is estimated, the dynamometer controller 7 superimposes, while performing velocity control on the second and third dynamometers 22 and 23 with the angular velocity detection signals w2 and w3, the vibration torque inputs d2 and d3 as necessary so as to perform the vibration control.

With reference back to FIG. 1, the estimation device 8 controls, as described above, the dynamometers 21 to 23 with the dynamometer controller 7 so as to estimate a transfer function matrix Gti indicating a mechanical characteristic (hereinafter also referred to as the "torque command-shaft torque characteristic") from the torque current command signals it to i3 to the shaft torque detection signals t1 to t3, a transfer function matrix Gwi indicating a mechanical characteristic (hereinafter also referred to as the "torque command-angular velocity characteristic") from the torque current command signals i1 to i3 to the angular velocity detection signals w1 to w3 and a transfer function matrix C indicating an input/output characteristic (hereinafter also referred to as the "control circuit characteristic") of the velocity controller 73 from the angular velocity detection signals w2 and w3 to the torque control inputs ib2 and ib3.

The transfer function matrix Gti indicating the torque command-shaft torque characteristic is first represented by a 3×3 matrix formed with a total of nine independent components as represented in equation (1) below. In equation (1) below, for example, a transfer function Gt1_i1 which is a component in the first column and the first row of the matrix Gti indicates the mechanical characteristic of the first shaft torque detection signal t1 for the first torque current command signal i1. A transfer function Gt1_i2 which is a component in the second column and the first row of the matrix Gti indicates the mechanical characteristic of the first shaft torque detection signal t1 for the second torque current command signal i2. The same is true for the other components, and thus the description thereof will be omitted.

$$\begin{pmatrix} t1 \\ t2 \\ t3 \end{pmatrix} = Gti \cdot \begin{pmatrix} i1 \\ i2 \\ i3 \end{pmatrix} \equiv \begin{pmatrix} Gt1\_i1 & Gt1\_i2 & Gt1\_i3 \\ Gt2\_i1 & Gt2\_i2 & Gt2\_i3 \\ Gt3\_i1 & Gt3\_i2 & Gt3\_i3 \end{pmatrix} \begin{pmatrix} i1 \\ i2 \\ i3 \end{pmatrix} \quad (1)$$

The transfer function matrix Gwi indicating the torque command-angular velocity characteristic is represented by a 3×3 matrix formed with a total of nine independent components as represented in equation (2) below. In equation (2) below, for example, a transfer function Gw1_i1 which is a component in the first column and the first row of the matrix Gwi indicates a transfer function of the mechanical characteristic of the first angular velocity detection signal w1 for the first torque current command signal i1. A transfer function Gw1_i2 which is a component in the second column and the first row of the matrix Gwi indicates a transfer function of the mechanical characteristic of the first angular velocity detection signal w1 for the second torque current command signal i2. The same is true for the other components, and thus the description thereof will be omitted.

$$\begin{pmatrix} w1 \\ w2 \\ w3 \end{pmatrix} = Gwi \cdot \begin{pmatrix} i1 \\ i2 \\ i3 \end{pmatrix} \equiv \begin{pmatrix} Gw1\_i1 & Gw1\_i2 & Gw1\_i3 \\ Gw2\_i1 & Gw2\_i2 & Gw2\_i3 \\ Gw3\_i1 & Gw3\_i2 & Gw3\_i3 \end{pmatrix} \begin{pmatrix} i1 \\ i2 \\ i3 \end{pmatrix} \quad (2)$$

In the dynamometer controller 7 as shown in FIG. 2, the input/output characteristic from the angular velocity detection signals w1 to w3 and the vibration torque inputs d1 to d3 which are the inputs thereof to the torque current command signals i1 to i3 which are the outputs thereof is represented by equation (3) below using a 3×3 unit matrix I and the transfer function matrix C indicating the control circuit characteristic of the velocity controller 73. Since in the computation of the estimation device 8, a frequency characteristic is measured when vibration is applied with the vibration torque inputs d1 to d3, the base torque command signal ib1, the average velocity command signal w_av and the differential velocity command signal dw which are not changed with time can be ignored as indicated in equation (3) below. Since in the velocity controller 73, the two angular velocity detection signals w2 and w3 are used as the inputs so as to generate the two torque control inputs ib2 and ib3, the transfer function matrix C is substantially represented by a 2×2 matrix as represented in equation (3) below. In equation (3) below, for example, a transfer function C22 which is a component in the second column and the second row of the matrix C indicates a transfer function of the second torque control input ib2 for the second angular velocity detection signal w2 in the velocity controller 73. A transfer function C23 which is a component in the third column and the second row of the matrix C indicates a transfer function of the second torque control input ib2 for the third angular velocity detection signal w3 in the velocity controller 73. The same is true for the other components, and thus the description thereof will be omitted.

$$I \cdot \begin{pmatrix} i1 \\ i2 \\ i3 \end{pmatrix} = I \cdot \begin{pmatrix} d1 \\ d2 \\ d3 \end{pmatrix} + C \cdot \begin{pmatrix} w1 \\ w2 \\ w3 \end{pmatrix} \equiv \begin{pmatrix} 1 & 0 & 0 \\ 0 & 1 & 0 \\ 0 & 0 & 1 \end{pmatrix} \cdot \begin{pmatrix} d1 \\ d2 \\ d3 \end{pmatrix} + \begin{pmatrix} 0 & 0 & 0 \\ 0 & C22 & C23 \\ 0 & C32 & C33 \end{pmatrix} \cdot \begin{pmatrix} w1 \\ w2 \\ w3 \end{pmatrix} \quad (3)$$

Figure 3A:
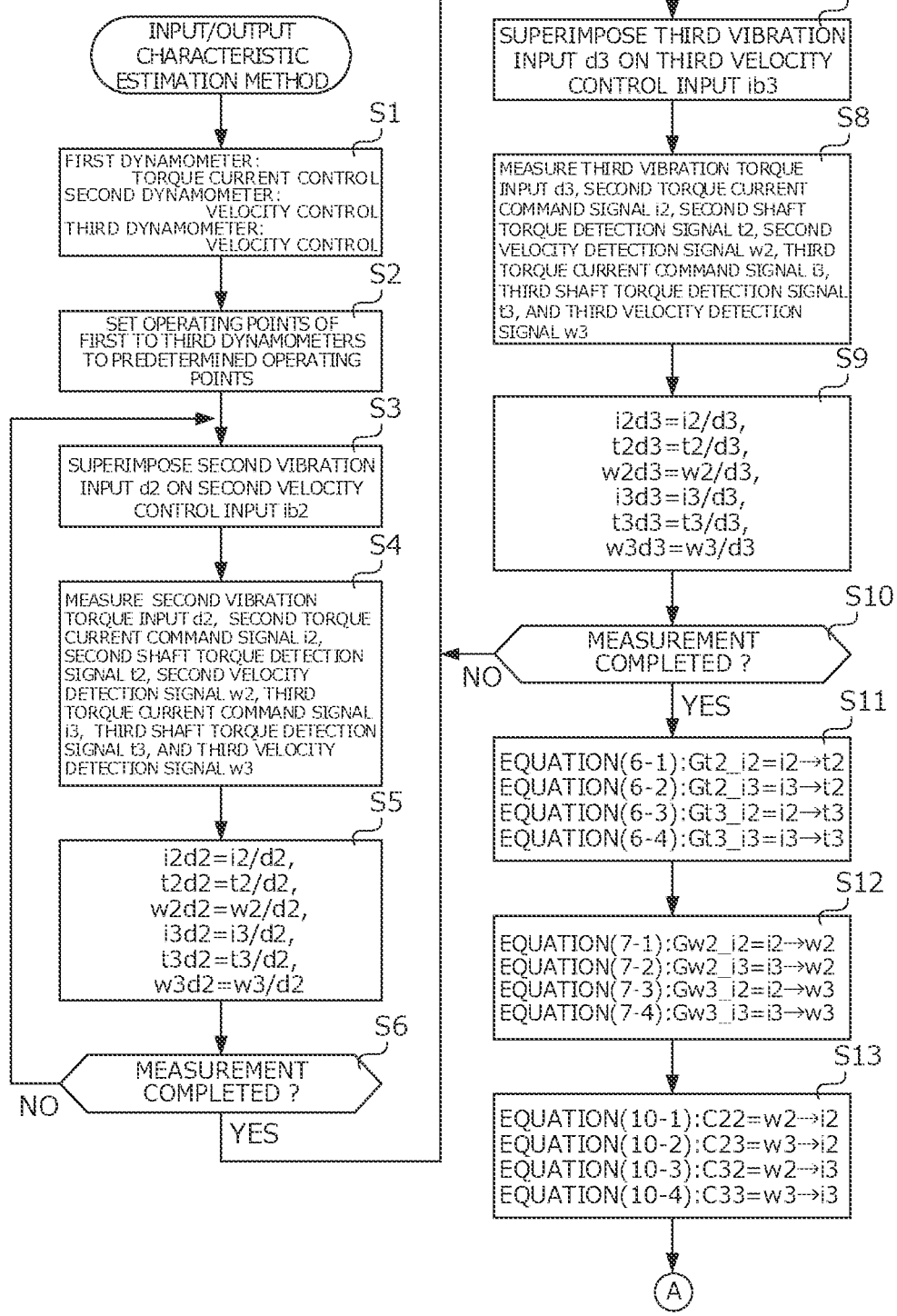
FIG. 3A is a flowchart showing a specific computation procedure for an input/output characteristic estimation method.
Figure 3B:
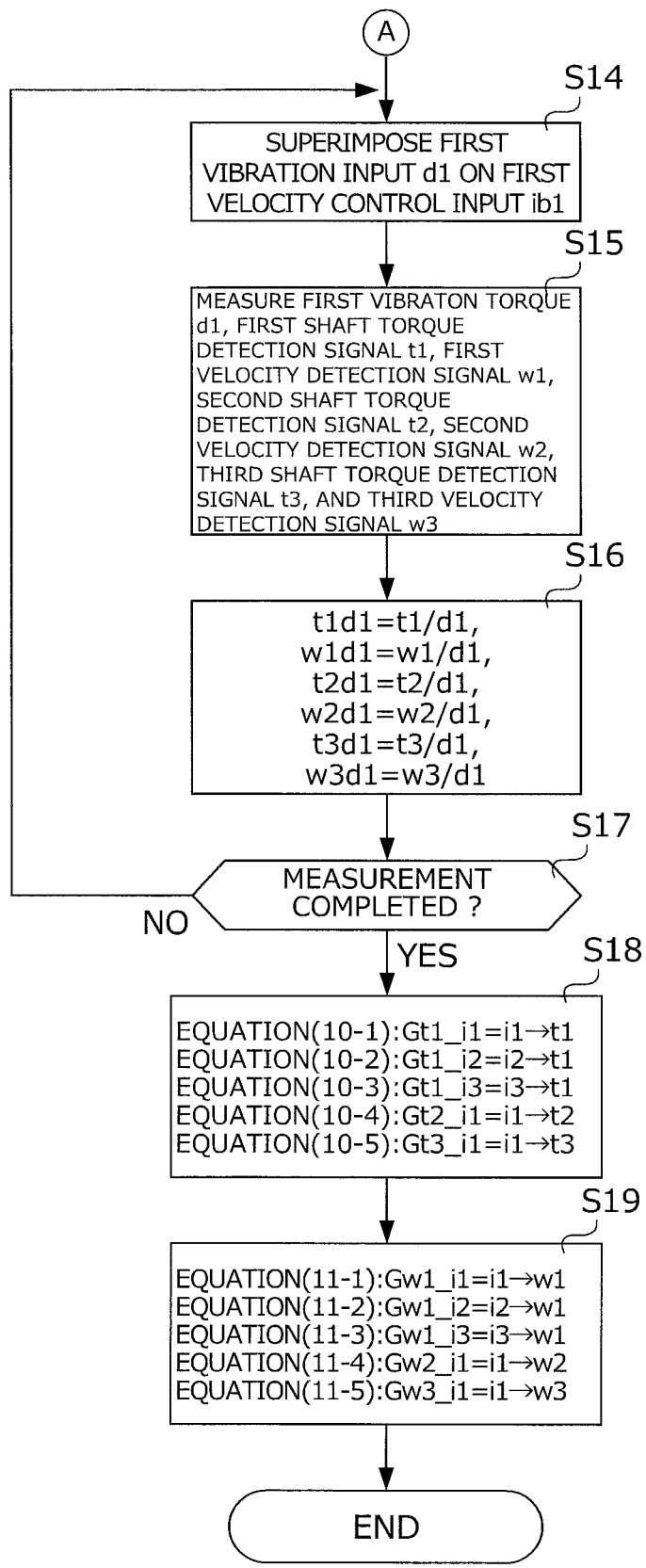
FIG. 3B is part which follows the flowchart of FIG. 3A.

The input/output characteristic estimation method using the test system S as described above will then be described. FIGS. 3A and 3B are a flowchart showing a specific computation procedure for the input/output characteristic estimation method.

In S1, the control of the first to third dynamometers using the dynamometer controller shown in FIG. 2 is started. In other words, the first dynamometer performs the torque current control using the base torque command signal ib1, and the second and third dynamometers perform the velocity control using the angular velocity detection signals w2 and w3 and the like. Each of the vibration torque inputs d1 to d3 is assumed to be zero.

In S2, the dynamometer controller sets the operating points of the first to third dynamometers to operating points which are previously determined for the measurement of the input/output characteristic. More specifically, with each of the vibration torque inputs d1 to d3 set to zero, the base torque command signal ib1 is set to a predetermined value so as to be constant, the average velocity command signal w_av is further set to a predetermined value so as to be constant and the differential velocity command signal dw is set to zero.

In S3, in the dynamometer controller, with the base torque command signal, the average velocity command signal and the differential velocity command signal maintained at the operating points in S2, the second vibration torque input d2 which is varied at a predetermined vibration frequency is generated, the second vibration torque input d2 is superimposed on the second torque control input ib2 and the second torque current command signal i2 is vibrated. Here, each of the other vibration torque inputs d1 and d3 is set to zero.

In S4, the estimation device measures the second vibration torque input d2, the second torque current command signal i2, the second shaft torque detection signal t2, the second angular velocity detection signal w2, the third torque current command signal i3, the third shaft torque detection signal t3 and the third angular velocity detection signal w3.

In S5, the estimation device calculates ratios between the second vibration torque input d2 measured in S4 and the other output signals i2, t2, w2, i3, t3 and w3 so as to measure, as indicated in equations (4-1) to (4-6) below, six frequency responses i2d2, t2d2, w2d2, i3d2, t3d2 and w3d2. Here, i2d2 represents the frequency response of the second torque current command signal i2 for the second vibration torque input d2 which is input to the second dynamometer 22, t2d2 represents the frequency response of the second shaft torque detection signal t2 for the input d2, w2d2 represents the frequency response of the second angular velocity detection signal w2 for the input d2, i3d2 represents the frequency response of the third torque current command signal i3 for the input d2, t3d2 represents the frequency response of the third shaft torque detection signal t3 for the input d2 and w3d2 represents the frequency response of the third angular velocity detection signal w3 for the input d2.

$$i2d2 = i2/d2 \quad (4\text{-}1)$$

$$t2d2 = t2/d2 \quad (4\text{-}2)$$

$$w2d2 = w2/d2 \quad (4\text{-}3)$$

$$i3d2 = i3/d2 \quad (4\text{-}4)$$

$$t3d2 = t3/d2 \quad (4\text{-}5)$$

$$w3d2 = w3/d2 \quad (4\text{-}6)$$

In S6, the estimation device determines whether or not the measurement of the six frequency responses such as i2d2 is completed within a predetermined frequency range. When the determination in S6 is no, the process is returned to S3, the vibration frequency of the second vibration torque input d2 is changed and the processing in S4 and S5 is performed again. When the determination in S6 is yes, the process is returned to S7.

In S7, in the dynamometer controller, with the base torque command signal, the average velocity command signal and the differential velocity command signal maintained at the operating points in S2, the third vibration torque input d3 which is varied at a predetermined vibration frequency is generated, the third vibration torque input d3 is superimposed on the third torque control input ib3 and the third torque current command signal i3 is vibrated. Here, each of the other vibration torque inputs d1 and d2 is set to zero.

In S8, the estimation device measures the third vibration torque input d3, the second torque current command signal i2, the second shaft torque detection signal t2, the second angular velocity detection signal w2, the third torque current command signal i3, the third shaft torque detection signal t3 and the third angular velocity detection signal w3.

In S9, the estimation device calculates ratios between the third vibration torque input d3 measured in S8 and the other output signals i2, t2, w2, i3, t3 and w3 so as to measure, as indicated in equations (5-1) to (5-6) below, six frequency responses i2d3, t2d3, w2d3, i3d3, t3d3 and w3d3. Here, i2d3 represents the frequency response of the second torque current command signal i2 for the third vibration torque input d3 which is input to the third dynamometer 23, t2d3 represents the frequency response of the second shaft torque detection signal t2 for the input d3, w2d3 represents the frequency response of the second angular velocity detection signal w2 for the input d3, i3d3 represents the frequency response of the third torque current command signal i3 for the input d3, t3d3 represents the frequency response of the third shaft torque detection signal t3 for the input d3 and w3d3 represents the frequency response of the third angular velocity detection signal w3 for the input d3.

$$i2d3 = i2/d3 \tag{5-1}$$

$$t2d3 = t2/d3 \tag{5-2}$$

$$w2d3 = w2/d3 \tag{5-3}$$

$$i3d3 = i3/d3 \tag{5-4}$$

$$t3d3 = t3/d3 \tag{5-5}$$

$$w3d3 = w3/d3 \tag{5-6}$$

In S10, the estimation device determines whether or not the measurement of the six frequency responses such as i2d3 is completed within a predetermined frequency range. When the determination in S10 is no, the process is returned to S7, the vibration frequency of the third vibration torque input d3 is changed and the processing in S8 and S9 is performed again. When the determination in S10 is yes, the process is proceeded to S11.

In S11, the estimation device uses the eight frequency responses i2d2, t2d2, i2d3, t2d3, i3d2, t3d2, i3d3 and t3d3 measured in the processing described above so as to calculate four transfer functions Gt2_i2, Gt2_i3, Gt3_i2 and Gt3_i3, and completes the processing. More specifically, the above-described frequency responses such as i2d2 are input to equations (6-1) to (6-4) below derived based on equations (1) to (3) described above, and thus the transfer functions such as Gt2_i2 are calculated. Gt2_i2 in equation (6-1) below represents a transfer function from the second torque current command signal i2 to the second shaft torque detection signal t2, Gt2_i3 in equation (6-2) below represents a transfer function from the third torque current command signal i3 to the second shaft torque detection signal t2, Gt3_i2 in equation (6-3) below represents a transfer function from the second torque current command signal i2 to the third shaft torque detection signal t3 and Gt3_i3 in equation (6-4) below represents a transfer function from the third torque current command signal i3 to the third shaft torque detection signal t3.

$$Gt2\_i2 = \frac{-i3d3 \cdot t2d2 + i3d2 \cdot t2d3}{i2d3 \cdot i3d2 - i2d2 \cdot i3d3} \tag{6-1}$$

$$Gt2\_i3 = \frac{i2d3 \cdot t2d2 - i2d2 \cdot t2d3}{i2d3 \cdot i3d2 - i2d2 \cdot i3d3} \tag{6-2}$$

$$Gt3\_i2 = \frac{-i3d3 \cdot t3d2 + i3d2 \cdot t3d3}{i2d3 \cdot i3d2 - i2d2 \cdot i3d3} \tag{6-3}$$

$$Gt3\_i3 = \frac{i2d3 \cdot t3d2 - i2d2 \cdot t3d3}{i2d3 \cdot i3d2 - i2d2 \cdot i3d3} \tag{6-4}$$

In S12, the estimation device uses the eight frequency responses i2d2, w2d2, i2d3, w2w3, i3d2, w3d2, i3d3 and w3d3 measured in the processing described above so as to calculate four transfer functions Gw2_i2, Gw2_i3, Gw3_i2 and Gw3_i3. More specifically, the frequency responses such as i2d2 are input to equations (7-1) to (7-4) below derived based on equations (1) to (3) described above, and thus the transfer functions such as Gw2_i2 are calculated. Gw2_i2 in equation (7-1) below represents a transfer function from the second torque current command signal i2 to the second angular velocity detection signal w2, Gw2_i3 in equation (7-2) below represents a transfer function from the third torque current command signal i3 to the second angular velocity detection signal w2, Gw3_i2 in equation (7-3) below represents a transfer function from the second torque current command signal i2 to the third angular velocity detection signal w3 and Gw3_i3 in equation (7-4) below represents a transfer function from the third torque current command signal i3 to the third angular velocity detection signal w3.

$$Gw2\_i2 = \frac{-i3d3 \cdot w2d2 + i3d2 \cdot w2d3}{i2d3 \cdot i3d2 - i2d2 \cdot i3d3} \tag{7-1}$$

$$Gw2\_i3 = \frac{i2d3 \cdot w2d2 - i2d2 \cdot w2d3}{i2d3 \cdot i3d2 - i2d2 \cdot i3d3} \tag{7-2}$$

$$Gw3\_i2 = \frac{-i3d3 \cdot w3d2 + i3d2 \cdot w3d3}{i2d3 \cdot i3d2 - i2d2 \cdot i3d3} \tag{7-3}$$

$$Gw3\_i3 = \frac{i2d3 \cdot w3d2 - i2d2 \cdot w3d3}{i2d3 \cdot i3d2 - i2d2 \cdot i3d3} \tag{7-4}$$

In S13, the estimation device uses the eight frequency responses i2d2, w2d2, i3d2, w3d2, i2d3, w2d3, i3d3 and w3d3 measured in the processing described above so as to calculate four transfer functions C22, C23, C32 and C33. More specifically, the frequency responses such as i2d2 are input to equations (8-1) to (8-4) below derived based on equations (1) to (3) described above, and thus the transfer functions such as C22 are calculated. C22 in equation (8-1) below represents a transfer function from the second angular velocity detection signal w2 to the second torque current command signal i2 (or the second torque control input ib2), C23 in equation (8-2) below represents a transfer function from the third angular velocity detection signal w3 to the second torque current command signal i2 (or the second torque control input ib2), C32 in equation (8-3) below represents a transfer function from the second angular velocity detection signal w2 to the third torque current command signal i3 (or the third torque control input ib3) and C33 in equation (8-4) below represents a transfer function from the third angular velocity detection signal w3 to the third torque current command signal i3 (or the third torque control input ib3).

$$C22 = \frac{w3d3 + i2d3 \cdot w3d2 - i2d2 \cdot w3d3}{w2d3 \cdot w3d2 - w2d2 \cdot w3d3} \tag{8-1}$$

$$C23 = \frac{w2d3 + i2d3 \cdot w2d2 - i2d2 \cdot w2d3}{-w2d3 \cdot w3d2 + w2d2 \cdot w3d3} \tag{8-2}$$

$$C32 = \frac{-w3d2 + i3d3 \cdot w3d2 - i3d2 \cdot w3d3}{w2d3 \cdot w3d2 - w2d2 \cdot w3d3} \tag{8-3}$$

$$C33 = \frac{-w2d2 + i3d3 \cdot w2d2 - i3d2 \cdot w2d3}{-w2d3 \cdot w3d2 + w2d2 \cdot w3d3} \tag{8-4}$$

In S14, in the dynamometer controller, with the base torque command signal, the average velocity command signal and the differential velocity command signal maintained at the operating points in S2, the first vibration torque input d1 which is varied at a predetermined vibration frequency is generated, the first vibration torque input d1 is superimposed on the base torque command signal ib1 and the first torque current command signal it is vibrated. Here, each of the other vibration torque inputs d2 and d3 is set to zero.

In S15, the estimation device measures the first vibration torque input d1, the first shaft torque detection signal t1, the first angular velocity detection signal w1, the second shaft torque detection signal t2, the second angular velocity detection signal w2, the third shaft torque detection signal t3 and the third angular velocity detection signal w3.

In S16, the estimation device calculates ratios between the first vibration torque input d1 measured in S15 and the other output signals t1, w1, t2, w2, t3 and w3 so as to measure, as indicated in equations (9-1) to (9-6) below, six frequency responses t1d1, w1d1, t2d1, w2d1, t3d1 and w3d1. Here, t1d1 represents the frequency response of the first shaft torque detection signal t1 for the first vibration torque input d1 which is input to the first dynamometer 21, w1d1 represents the frequency response of the first angular velocity detection signal w1 for the input d1, t2d1 represents the frequency response of the second shaft torque detection signal t2 for the input d1, w2d1 represents the frequency response of the second angular velocity detection signal w2 for the input d1, t3d1 represents the frequency response of the third shaft torque detection signal t3 for the input d1 and w3d1 represents the frequency response of the third angular velocity detection signal w3 for the input d1.

$$t1d1 = t1/d1 \tag{9-1}$$

$$w1d1 = w1/d1 \tag{9-2}$$

$$t2d1 = t2/d1 \tag{9-3}$$

$$w2d1 = w2/d1 \tag{9-4}$$

$$t3d1 = t3/d1 \tag{9-5}$$

$$w3d1 = w3/d1 \tag{9-6}$$

In S17, the estimation device determines whether or not the measurement of the six frequency responses such as t1d1 is completed within a predetermined frequency range. When the determination in S17 is no, the process is returned to S14, the vibration frequency of the first vibration torque input d1 is changed and the processing in S15 and S16 is performed again. When the determination in S17 is yes, the process is proceeded to S18.

In S18, the estimation device uses the six frequency responses t1d1, w1d1, t2d1, w2d1, t3d1 and w3d1 measured in S16 and the twelve transfer functions (see S11 to S13) calculated based on the frequency responses measured by the vibration control (see S3 to S5) on the second dynamometer and the vibration control (see S7 to S9) on the third dynamometer, and thereby calculates the five transfer functions Gt1_i1, Gt1_i2, Gt1_i3, Gt2_i1 and Gt3_i1. More specifically, the frequency responses such as t1d1 for the first vibration torque input d1 measured in S16, the frequency responses such as t1d2 for the vibration torque inputs d2 and d3 measured in S5 and S9 and the transfer functions such as Gw2_i2 and C22 calculated in S11 to S13 based on these frequency responses such as t1d2 are input to equations (10-1) to (10-5) below derived based on equations (1) to (3) described above, and thus the transfer functions such as Gt1_i1 are calculated.

$$\begin{aligned}Gt1\_i1 = &t1d1 - C22 \cdot t1d2 \cdot w2d1 + \\&C22^2 \cdot Gw2\_i2 \cdot t1d2 \cdot w2d1 + \\&C22 \cdot C32 \cdot Gw2\_i3 \cdot t1d2 \cdot w2d1 + \\&C22 \cdot C23 \cdot Gw3\_i2 \cdot t1d2 \cdot w2d1 + \\&C23 \cdot C32 \cdot Gw3\_i3 \cdot t1d2 \cdot w2d1 - C32 \cdot t1d3 \cdot w2d1 + \\&C22 \cdot C32 \cdot Gw2\_i2 \cdot t1d3 \cdot w2d1 + \\&C32^2 \cdot Gw2\_i3 \cdot t1d3 \cdot w2d1 + \\&C22 \cdot C33 \cdot Gw3\_i2 \cdot t1d3 \cdot w2d1 + \\&C32 \cdot C33 \cdot Gw3\_i3 \cdot t1d3 \cdot w2d1 - C23 \cdot t1d2 \cdot w3d1 + \\&C22 \cdot C23 \cdot Gw2\_i2 \cdot t1d2 \cdot w3d1 + \\&C22 \cdot C33 \cdot Gw2\_i3 \cdot t1d2 \cdot w3d1 + \\&C23^2 \cdot Gw3\_i2 \cdot t1d2 \cdot w3d1 + \\&C23 \cdot C33 \cdot Gw3\_i3 \cdot t1d2 \cdot w3d1 - C33 \cdot t1d3 \cdot w3d1 + \\&C23 \cdot C32 \cdot Gw2\_i2 \cdot t1d3 \cdot w3d1 + \\&C32 \cdot C33 \cdot Gw2\_i3 \cdot t1d3 \cdot w3d1 + \\&C23 \cdot C33 \cdot Gw3\_i2 \cdot t1d3 \cdot w3d1 + \\&C33^2 \cdot Gw3\_i3 \cdot t1d3 \cdot w3d1\end{aligned} \tag{10-1}$$

$$\begin{aligned}Gt1\_i2 = &t1d2 - C22 \cdot Gw2\_i2 \cdot t1d2 - C23 \cdot Gw3\_i2 \cdot t1d2 - \\&C32 \cdot Gw2\_i2 \cdot t1d3 - C33 \cdot Gw3\_i2 \cdot t1d3\end{aligned} \tag{10-2}$$

$$\begin{aligned}Gt1\_i3 = &t1d3 - C22 \cdot Gw2\_i3 \cdot t1d2 - C23 \cdot Gw3\_i3 \cdot t1d2 - \\&C32 \cdot Gw2\_i3 \cdot t1d3 - C33 \cdot Gw3\_i3 \cdot t1d3\end{aligned} \tag{10-3}$$

$$\begin{aligned}Gt2\_i1 = &t2d1 - C22 \cdot Gt2\_i2 \cdot w2d1 - C32 \cdot Gt2\_i3 \cdot w2d1 - \\&C23 \cdot Gt2\_i2 \cdot w3d1 - C33 \cdot Gt2\_i3 \cdot w3d1\end{aligned} \tag{10-4}$$

$$\begin{aligned}Gt3\_i1 = &t3d1 - C22 \cdot Gt3\_i2 \cdot w2d1 - C32 \cdot Gt3\_i3 \cdot w2d1 - \\&C23 \cdot Gt3\_i2 \cdot w3d1 - C33 \cdot Gt3\_i3 \cdot w3d1\end{aligned} \tag{10-5}$$

In S19, the estimation device uses the six frequency responses t1d1, w1d1, t2d1, w2d1, t3d1 and w3d1 measured in S16 and the twelve transfer functions (see S11 to S13) calculated based on the frequency responses measured by the vibration control (see S3 to S5) on the second dynamometer and the vibration control (see S7 to S9) on the third dynamometer, thereby calculates the five transfer functions Gw1_i1, Gw1_i2, Gw1_i3, Gw2_i1 and Gw3_i1 and completes the processing. More specifically, the frequency responses such as t1d1 for the first vibration torque input d1 measured in S16, the frequency responses such as t1d2 for the vibration torque inputs d2 and d3 measured in S5 and S9 and the transfer functions such as Gw2_i2 and C22 calculated in S11 to S13 based on these frequency responses such as t1d2 are input to equations (11-1) to (11-5) below derived based on equations (1) to (3) described above, and thus the transfer functions such as Gw1_i1 are calculated.

$$\begin{aligned}Gw1\_i1 = &w1d1 - C22 \cdot w1d2 \cdot w2d1 + \\&C22^2 \cdot Gw2\_i2 \cdot w1d2 \cdot w2d1 + \\&C22 \cdot C32 \cdot Gw2\_i3 \cdot w1d3 \cdot w2d1 + \\&C22 \cdot C23 \cdot Gw3\_i2 \cdot w1d2 \cdot w2d1 + \\&C23 \cdot C32 \cdot Gw3\_i3 \cdot w1d2 \cdot w2d1 - C32 \cdot w1d3 \cdot w2d1 + \\&C22 \cdot C32 \cdot Gw2\_i2 \cdot w1d3 \cdot w2d1 + \\&C32^2 \cdot Gw2\_i3 \cdot w1d3 \cdot w2d1 + \\&C22 \cdot C33 \cdot Gw3\_i2 \cdot w1d3 \cdot w2d1 + \\&C32 \cdot C33 \cdot Gw3\_i3 \cdot w1d3 \cdot w2d1 - C23 \cdot w1d2 \cdot w3d1 + \\&C22 \cdot C23 - Gw2\_i2 \cdot w1d2 \cdot w3d1 + \\&C22 \cdot C33 \cdot Gw2\_i3 \cdot w1d2 \cdot w3d1 + \\&C23^2 \cdot Gw3\_i2 \cdot w1d2 \cdot w3d1 + \\&C23 \cdot C33 \cdot Gw3\_i3 \cdot w1d2 \cdot w3d1 - C33 \cdot w1d3 \cdot w3d1 + \\&C23 \cdot C32 \cdot Gw2\_i2 \cdot w1d3 \cdot w3d1 + \\&C32 \cdot C33 \cdot Gw2\_i3 w1d3 \cdot w3d1 + \\&C23 \cdot C33 \cdot Gw3\_i2 \cdot w1d3 \cdot w3d1 + \\&C33^2 \cdot Gw3\_i3 \cdot w1d3 \cdot w3d1\end{aligned} \tag{11-1}$$

$$\begin{aligned}Gw1\_i2 = &w1d2 - C22 \cdot Gw2\_i2 \cdot w1d2 - \\&C23 \cdot Gw3\_i2 \cdot w1d2 - C32 \cdot Gw2\_i2 \cdot w1d3 - \\&C33 \cdot Gw3\_i2 \cdot w1d3\end{aligned} \tag{11-2}$$

$$\begin{aligned}Gw1\_i3 = &w1d3 - C22 \cdot Gw2\_i3 \cdot w1d2 - \\&C23 \cdot Gw3\_i3 \cdot w1d2 - C32 \cdot Gw2\_i3 \cdot w1d3 - \\&C33 \cdot Gw3\_i3 \cdot w1d3\end{aligned} \tag{11-3}$$

$$\begin{aligned}Gw2\_i1 = &w2d1 - C22 \cdot Gw2\_i2 \cdot w2d1 - \\&C32 \cdot Gw2\_i3 \cdot w2d1 - C23 \cdot Gw2\_i2 \cdot w3d1 - \\&C33 \cdot Gw2\_i3 \cdot w3d1\end{aligned} \tag{11-4}$$

$$\begin{aligned}Gw3\_i1 = &w3d1 - C22 \cdot Gw3\_i2 \cdot w2d1 - \\&C32 \cdot Gw3\_i3 \cdot w2d1 - C23 \cdot Gw3\_i2 \cdot w3d1 - \\&C33 \cdot Gw3\_i3 \cdot w3d1\end{aligned} \tag{11-5}$$

<Mechanical Characteristic Estimation Method>

Figure 4:
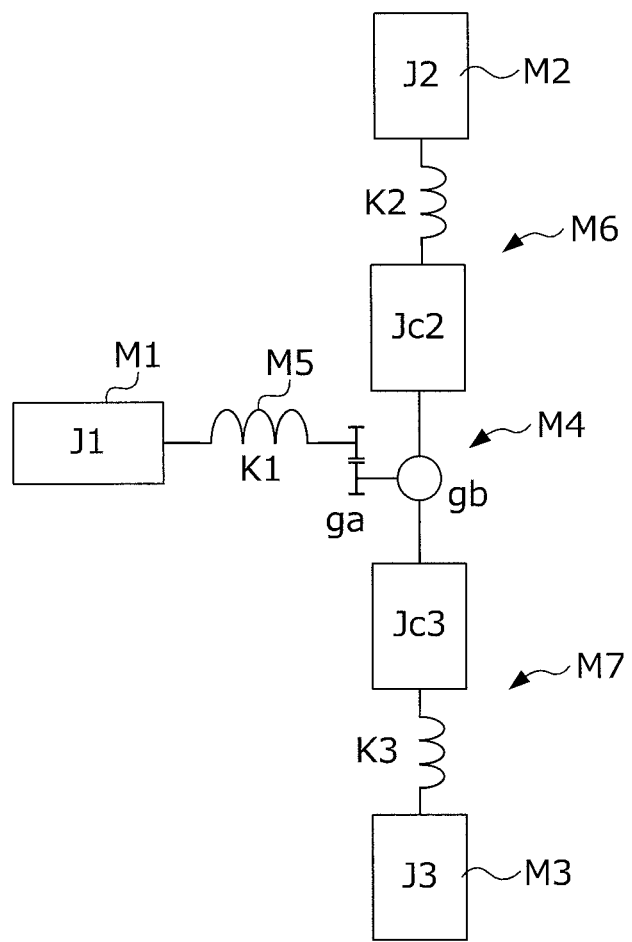
FIG. 4 is a diagram showing a five-inertia system model obtained by approximating the mechanical system of the test system.

FIG. 4 is a diagram showing a five-inertia system model obtained by approximating a mechanical system formed by connecting the first to third dynamometers 21 to 23 to the test piece W. As shown in FIG. 4, the mechanical system of the test system S described above is approximated by the five-inertia system model that includes: a first inertia body M1 which has the moment of inertia J1 of the first dynamometer 21; a second inertia body M2 which has the moment of inertia J2 of the second dynamometer 22; a third inertia body M3 which has the moment of inertia J3 of the third dynamometer 23; a transmission element M4 which changes gears at the total gear ratio g (=ga×gb) obtained by multiplying together the transmission gear ratio ga and the final gear ratio gb between one input portion and two output portions; a first shaft body M5 which has a predetermined spring stiffness K1 and which connects together the first inertia body M1 and the input portion of the transmission element M4; a second shaft body M6 which has a second moment of inertia Jc2 and a spring stiffness K2 and which connects together one of the output portions of the transmission element M4 and the second inertia body M2; and a third shaft body M7 which has a third moment of inertia Jc3 and a spring stiffness K3 and which connects together the other of the output portions of the transmission element M4 and the third inertia body M3.

In FIG. 4, the spring stiffness K1 is one of the mechanical characteristic parameters which characterize the mechanical characteristic of the test piece W, and mainly corresponds to the spring stiffness of a lock-up clutch included in the transmission TM1 of the test piece W. The spring stiffness K2 is one of the mechanical characteristic parameters which characterize the mechanical characteristic of the test piece W, and mainly corresponds to the spring stiffness of the second shaft of the test piece W. The spring stiffness K3 is one of the mechanical characteristic parameters which characterize the mechanical characteristic of the test piece W, and mainly corresponds to the spring stiffness of the third shaft S3 of the test piece W. The second moment of inertia Jc2 is one of the mechanical characteristic parameters which characterize the mechanical characteristic of the test piece W, and mainly corresponds to a conversion value of the entire inertia of the test piece W on the side of the second dynamometer 22. The third moment of inertia Jc3 is one of the mechanical characteristic parameters which characterize the mechanical characteristic of the test piece W, and mainly corresponds to a conversion value of the entire inertia of the test piece W on the side of the third dynamometer 23.

Figure 5:
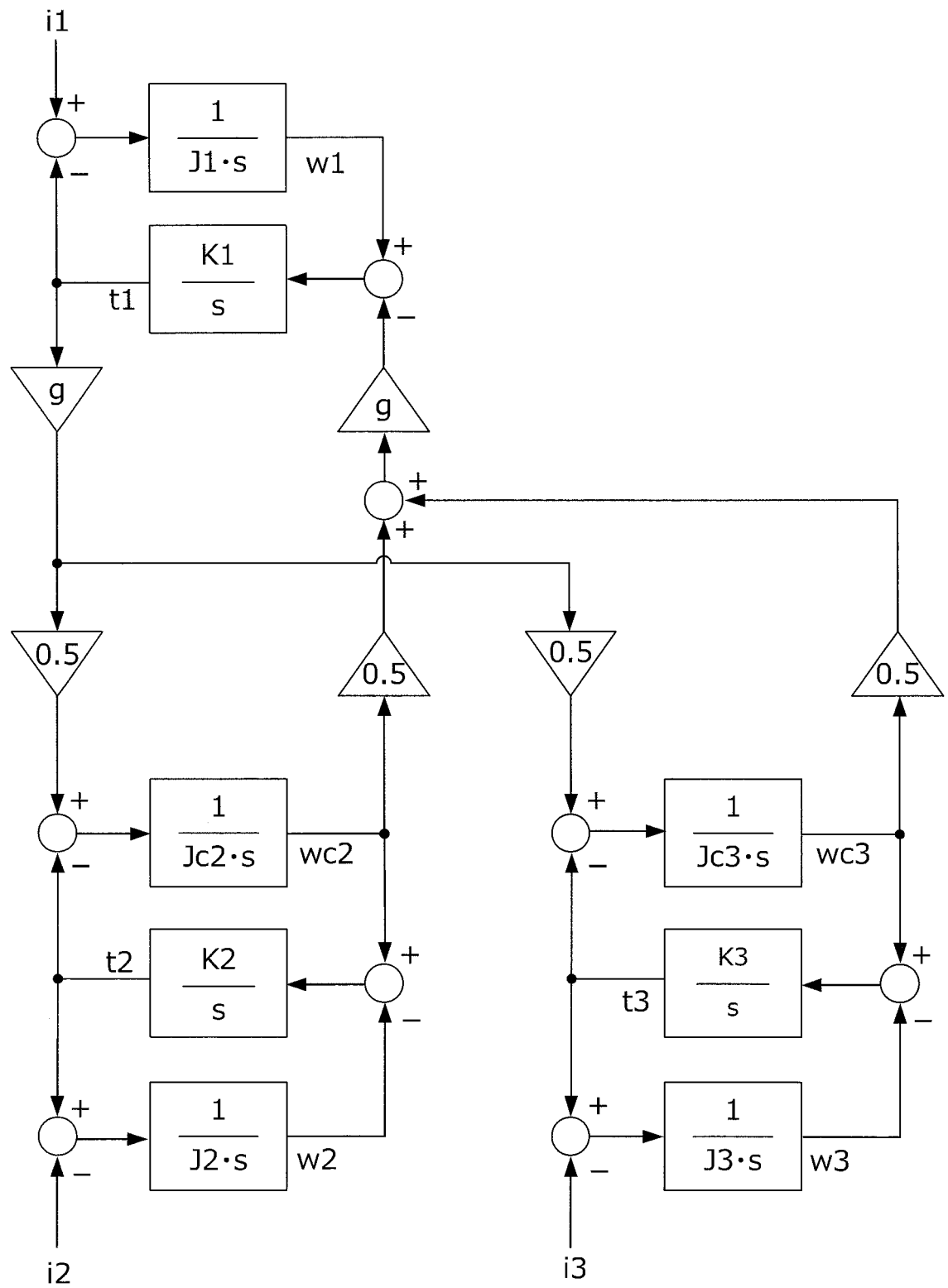
FIG. 5 is a block diagram showing the equation of motion of the five-inertia system model in FIG. 4.

FIG. 5 is a block diagram showing the equation of motion of the five-inertia system model shown in FIG. 4. FIG. 5 shows a case where the differential gear TM2 of the test piece W is operated in an ideal state where there is no velocity difference between the left and right thereof.

The equation of motion of the five-inertia system model is represented by equations (12-1) to (12-8) below.

$$w1 = \frac{1}{J1 \cdot s}(i1 - t1) \tag{12-1}$$

$$t1 = \frac{K1}{s}\left(w1 - g\frac{w2c + w3c}{2}\right) \tag{12-2}$$

$$wc2 = \frac{1}{Jc2 \cdot s}\left(\frac{g}{2}t1 - t2\right) \tag{12-3}$$

$$wc3 = \frac{1}{Jc3 \cdot s}\left(\frac{g}{2}t1 - t3\right) \tag{12-4}$$

$$t2 = \frac{K2}{s}(wc2 - w2) \tag{12-5}$$

$$t3 = \frac{K3}{s}(wc3 - w3) \tag{12-6}$$

$$w2 = \frac{1}{J2 \cdot s}(t2 - i2) \tag{12-7}$$

$$w3 = \frac{1}{J3 \cdot s}(t3 - i3) \tag{12-8}$$

In the mechanical characteristic estimation method of the present embodiment, in order to easily treat the five-inertia system model described above, the followings are assumed. Firstly, it is assumed that the moments of inertia J2 and J3 are equal to each other (J2=J3). Since the ratings of the second dynamometer 22 and the third dynamometer 23 are the same as each other, this assumption is appropriate. Secondly, it is assumed that each of the moments of inertia Jc2 and Jc3 is zero (Jc2=Jc3=0). Since the moment of inertia of the test piece W is sufficiently low as compared with the moments of inertia J1 to J3 of the dynamometers, this assumption is also appropriate. Thirdly, it is assumed that the spring stiffnesses K2 and K3 of the second shaft S2 and the third shaft S3 which correspond to the left and right drive shafts of the test piece W are equal to each other (K2=K3). Although in general, left and right drive shafts differ in length in a strict sense such that they also differ in spring stiffness, the difference thereof is not excessively large, and thus this assumption is also appropriate.

When under the assumptions as described above, the equation of motion (12-1) to (12-8) described above is solved with respect to w1, t1, wc2, wc3, t2, t3, w2 and w3, and the transfer function from the input (i1, i2, i3) serving as the torque current command signal to the output (w1, t1, wc2, wc3, t2, t3, w2, w3) is further calculated, the characteristic polynomial thereof is as indicated in equation (13) below. In the mechanical characteristic estimation method of the present embodiment, the values of the spring stiffnesses K1 and K2 which are unknown mechanical characteristic parameters are estimated based on equation (13) below.

$$D(s) = J1 \cdot J2(g^2 \cdot K1 + 2 \cdot K2)s^2 + (g^2 \cdot J1 + 2 \cdot J2) \cdot K1 \cdot K2 \tag{13}$$

Figure 6:
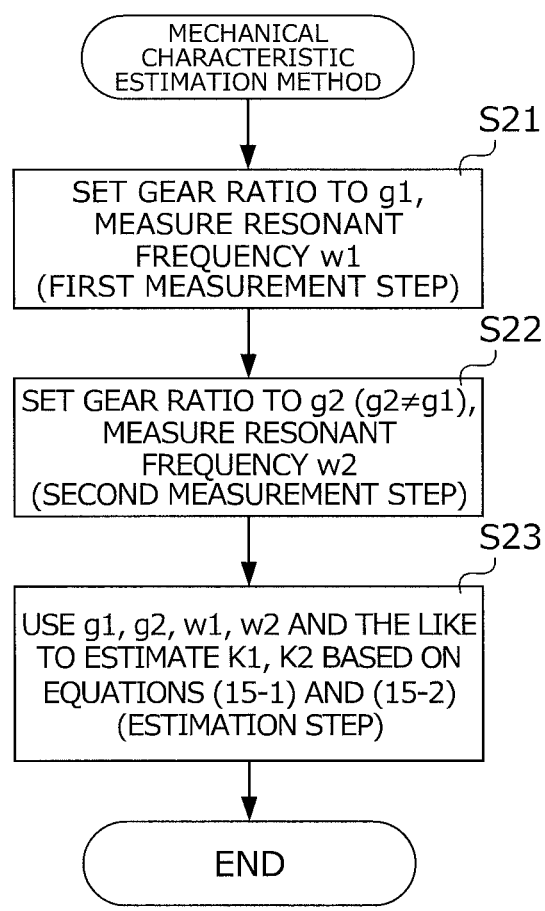
FIG. 6 is a flowchart showing a specific procedure for the mechanical characteristic estimation method.

FIG. 6 is a flowchart showing a specific procedure for the mechanical characteristic estimation method of the present embodiment. The mechanical characteristic estimation method is formed with a first measurement step (S21), a second measurement step (S22) and an estimation step (S23).

At the beginning, in the first measurement step of S21, an operator sets the transmission gear ratio ga of the test piece W to a predetermined first transmission gear ratio ga1 which is determined in a changeable range (gaL to gaH), and measures the resonant frequency of the test piece W in which the transmission gear ratio is set as described above. In the following description, the total gear ratio of the test piece W in the first measurement step is represented by "g1". In other words, g1=ga1×gb. In the first measurement step, the resonant frequency which is measured in a state where the total gear ratio of the test piece W is g1 is represented by "ω1".

In the first measurement step, the resonant frequency of ω1 of the test piece W can be measured by use of any one of the total of eighteen transfer functions (Gt1_i1 to Gt1_i3, Gt2_i1 to Gt2_i3, Gt3_i1 to Gt3_i3, Gw1_i1 to Gw1_i3, Gw2_i1 to Gw2_i3 and Gw3_i1 to Gw3_i3) represented in equations (1) and (2) acquired by performing, for example, the input/output characteristic estimation method of FIGS. 3A and 3B on the test piece W in which the gear ratio is set to g1 as described above.

Figure 7A:
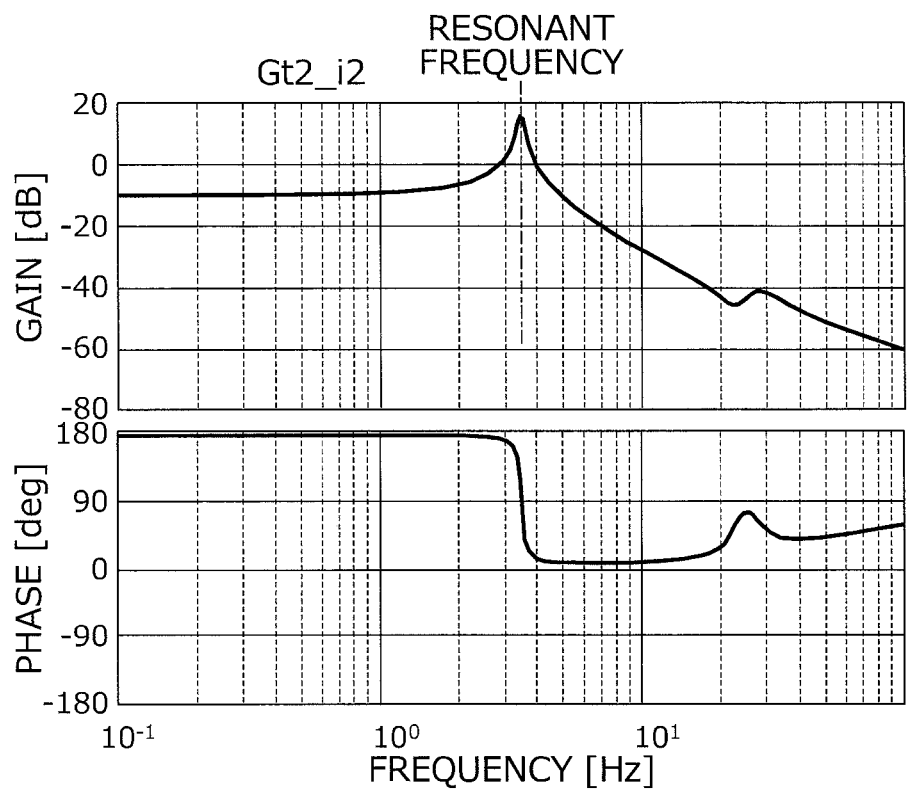
FIG. 7A is one Bode diagram among a plurality of transfer functions obtained by performing the input/output characteristic estimation method.
Figure 7B:
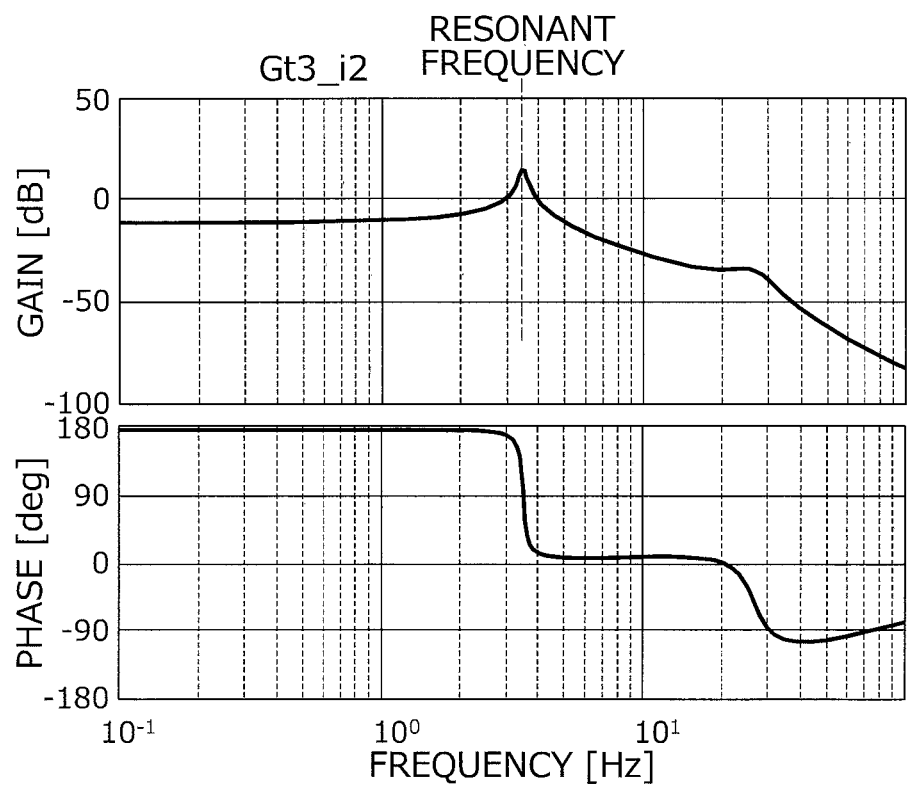
FIG. 7B is one Bode diagram among the transfer functions obtained by performing the input/output characteristic estimation method.

FIGS. 7A and 7B are Bode diagrams for two (Gt2_i2 and Gt3_i2) of the total of eighteen transfer functions obtained by performing the input/output characteristic estimation method of FIGS. 3A and 3B. In the first measurement step, as shown in FIGS. 7A and 7B, a frequency at which a gain is a peak value by a resonance phenomenon is measured from the transfer functions measured by performing the input/output characteristic estimation method as described above, and the frequency is assumed to be the resonant frequency ω1.

With reference back to FIG. 6, in the second measurement step of S22, the operator sets the transmission gear ratio ga of the test piece W to a second transmission gear ratio ga2 which is determined to be different from the first transmission gear ratio ga1 (ga2≠ga1) in the changeable range (gaL to gaH), and measures the resonant frequency of the test piece W in which the transmission gear ratio is set as described above. In the following description, the total gear ratio of the test piece W in the second measurement step is represented by "g2". In other words, g2=ga2×gb. In the second measurement step, the resonant frequency which is measured in a state where the total gear ratio of the test piece W is g2 is represented by "ω2". Since a specific procedure for measuring the resonant frequency ω2 in the second measurement step is the same as in the first measurement step, the detailed description thereof will be omitted. As described above, the second transmission gear ratio ga2 and the first transmission gear ratio ga1 are set to the different values. Hence, in the first measurement step and the second measurement step, the values of the total gear ratios of the test piece W differ (ga1≠ga2), and thus the values of the measured resonant frequencies differ (ω1≠ω2).

In the estimation step of S23, the resonant frequencies ω1 and ω2 and the gear ratios g1 and g2 obtained through the first and second measurement steps are used, and thus the estimated values of the spring stiffnesses K1 and K2 which are unknown mechanical characteristic parameters are calculated. A procedure for calculating the estimated values of the spring stiffnesses K1 and K2 in the estimation step will be described below.

When the resonant frequencies ω1 and ω2 and the gear ratios g1 and g2 are first substituted into the right side of the characteristic equation (13) described above, simultaneous equations (14-1) and (14-2) for the spring stiffnesses K1 and K2 can be obtained.

$$J1 \cdot J2(g1^2 \cdot K1 + 2 \cdot K2)\omega1^2 - (g1^2 \cdot J1 + 2 \cdot J2) \cdot K1 \cdot K2 = 0 \quad (14\text{-}1)$$

$$J1 \cdot J2(g2^2 \cdot K1 + 2 \cdot K2)\omega2^2 - (g2^2 \cdot J1 + 2 \cdot J2) \cdot K1 \cdot K2 = 0 \quad (14\text{-}2)$$

When the equations (14-1) and (14-2) described above are solved with respect to the spring stiffnesses K1 and K2, estimation equations (15-1) and (15-2) for the spring stiffnesses K1 and K2 are derived.

$$K1 = \frac{2 \cdot J1 \cdot J2 \cdot \omega2^2 \cdot \omega1^2 \cdot (g2 - g1) \cdot (g2 + g1)}{g2^2 \cdot \omega2^2 \cdot (g1^2 \cdot J1 + 2 \cdot J2) - g1^2 \cdot \omega1^2 \cdot (g2^2 \cdot J1 + 2 \cdot J2)} \quad (15\text{-}1)$$

-continued $$K2 = \frac{J1 \cdot J2 \cdot \omega2^2 \cdot \omega1^2 \cdot (g2 - g1) \cdot (g2 + g1)}{\omega1^2 \cdot (g2^2 \cdot J1 + 2 \cdot J2) - \omega2^2 \cdot (g1^2 \cdot J1 + 2 \cdot J2)} \quad (15\text{-}2)$$

In the estimation step, the values of the resonant frequencies ω1 and ω2 and the gear ratios g1 and g2 which are previously acquired and the values of the moments of inertia J1 and J2 of the dynamometers which are known from the design values thereof are input to the estimation equations (15-1) and (15-2) described above, and thus the estimated values of the spring stiffnesses K1 and K2 are calculated.

When the gear ratio g1 in the first measurement step and the gear ratio g2 in the second measurement step are close to each other (g1≈g2), the resonant frequencies ω1 and ω2 are also close to each other (ω1≈ω2), and thus the denominators of the estimation equations (15-1) and (15-2) used in the estimation step are close to zero, with the result that the accuracy of the estimation may be deteriorated. Hence, the transmission gear ratios ga1 and ga2 are preferably set such that the absolute value |g1−g2| of the difference between the gear ratio g1 in the first measurement step and the gear ratio g2 in the second measurement step is maximized. More specifically, preferably, the first transmission gear ratio ga1 is set to, for example, the minimum transmission gear ratio gaL which is the lowest in the changeable range (that is, the total gear ratio in the first measurement step is set to gL=gaL×gb), the second transmission gear ratio ga2 is set to, for example, the maximum transmission gear ratio gaH which is the highest in the changeable range (that is, the total gear ratio in the second measurement step is set to gH=gaH×gb) and thus the absolute value |gL−gH| of the difference between the gear ratios is maximized. In this way, it is possible to enhance the accuracy of the estimation.

Although the embodiment of the present invention is described above, the present invention is not limited to this embodiment. The detailed configuration may be modified as necessary without departing from the spirit of the present invention.

EXPLANATION OF REFERENCE NUMERALS

S: test system
W: test piece
TM1: transmission (transmission mechanism)
TM2: differential gear (transmission mechanism)
S1: first shaft
S2: second shaft
S3: third shaft
21: first dynamometer (first electric motor)
22: second dynamometer (second electric motor)
23: third dynamometer (third electric motor)

The invention claimed is:

1. A mechanical characteristic estimation method of calculating an estimation value of a mechanical characteristic parameter of a test piece which includes a first shaft and a second shaft and a third shaft that are connected to the first shaft through a transmission mechanism so as to be able to transfer power thereto, the mechanical characteristic estimation method comprising:
measuring a first resonant frequency of the test piece in a state where a gear ratio of the transmission mechanism is set to a first gear ratio;
measuring a second resonant frequency of the test piece in a state where the gear ratio of the transmission mechanism is set to a second gear ratio different from the first gear ratio; and calculating the estimation value of the mechanical characteristic parameter by using the first resonant frequency, the second resonant frequency, the first gear ratio and the second gear ratio.

2. The mechanical characteristic estimation method according to claim 1, wherein the first gear ratio is either of a minimum gear ratio and a maximum gear ratio of gear ratios which can be set in the transmission mechanism, and the second gear ratio is the other of the minimum gear ratio and the maximum gear ratio.

3. The mechanical characteristic estimation method according to claim 1, wherein a first electric motor is coupled to the first shaft, a second electric motor is coupled to the second shaft,
a third electric motor is coupled to the third shaft and
in the measuring steps, a torque current command signal to any one of the first electric motor, the second electric motor and the third electric motor is set to an input, any one of a shaft torque of the first shaft, a shaft torque of the second shaft, a shaft torque of the third shaft, an angular velocity of the first electric motor, an angular velocity of the second electric motor and an angular velocity of the third electric motor is set to an output and the first resonant frequency and the second resonant frequency are measured based on a frequency response from the input to the output.

4. The mechanical characteristic estimation method according to claim 3, wherein the first gear ratio is either of a minimum gear ratio and a maximum gear ratio of gear ratios which can be set in the transmission mechanism, and the second gear ratio is the other of the minimum gear ratio and the maximum gear ratio.

5. The mechanical characteristic estimation method according to claim 3, wherein a mechanical system formed by connecting the first, second and third electric motors to the test piece is modeled by a five-inertia system model that includes: a first inertia body which has a moment of inertia of the first electric motor; a second inertia body which has a moment of inertia of the second electric motor; a third inertia body which has a moment of inertia of the third electric motor; a transmission element which changes gears at the gear ratio between one input portion and two output portions; a first shaft body which has a predetermined first spring stiffness and which connects together the first inertia body and the input portion; a second shaft body which has a second moment of inertia and a second spring stiffness and which connects together one of the two output portions and the second inertia body; and a third shaft body which has a third moment of inertia and a third spring stiffness and which connects together the other of the two output portions and the third inertia body, and the mechanical characteristic parameter is any one of the first, second and third spring stiffnesses.

6. The mechanical characteristic estimation method according to claim 5, wherein the first gear ratio is either of a minimum gear ratio and a maximum gear ratio of gear ratios which can be set in the transmission mechanism, and the second gear ratio is the other of the minimum gear ratio and the maximum gear ratio.

* * * * *